Nov. 12, 1940.   I. R. SMITH   2,221,616
COPPER OXIDE RECTIFIER
Filed Sept. 19, 1939   2 Sheets-Sheet 1
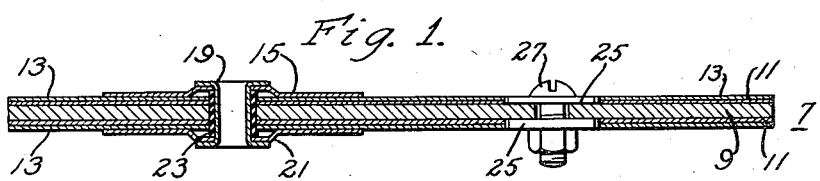
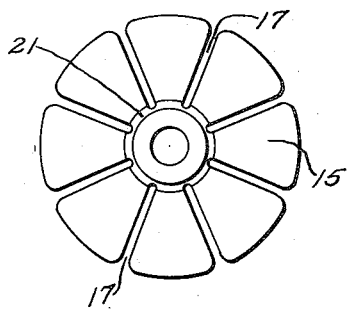
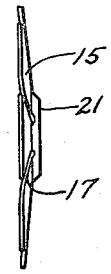
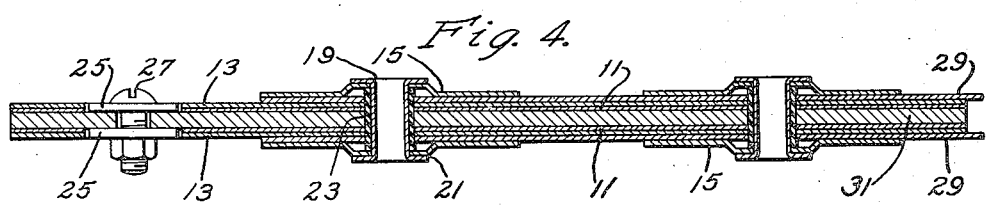
WITNESSES:
Leon M. Garman
Hymen Diamond
INVENTOR
Irving R. Smith.
BY
F. W. Lyle.
ATTORNEY Nov. 12, 1940.　　　　I. R. SMITH　　　　2,221,616
COPPER OXIDE RECTIFIER
Filed Sept. 19, 1939　　　2 Sheets-Sheet 2

WITNESSES:

INVENTOR
Irving R. Smith.
BY
ATTORNEY

Patented Nov. 12, 1940

2,221,616

UNITED STATES PATENT OFFICE 2,221,616

COPPER OXIDE RECTIFIER

Irving R. Smith, Wilkinsburg, Pa., assignor to Westinghouse Electric & Manufacturing Company, East Pittsburgh, Pa., a corporation of Pennsylvania Application September 19, 1939, Serial No. 295,587

5 Claims. (Cl. 175—366)

My invention relates to rectifiers in which the asymmetric effect is produced by the cooperation of a metal and a compound of the metal deposited on its surface and has particular relation to rectifiers in the form of plates as distinguished from discs.

In the past, difficulty has been encountered in connecting the current collecting terminals to a rectifier of the plate type. According to the teachings of the prior art spring clips are provided along the edges of the plate and the current conducting leads are connected to the clips. I have found that the clips fail to apply positive contact pressure and, in addition, are expensive and offer difficulties when being engaged with the plates. Once the clips have been disposed on the plates, they very often shift along the plates when the plates are subjected to vibrations.

It is, accordingly, an object of my invention to provide a current-collecting terminal and for a rectifier of the plate type that shall apply positive contact pressure.

Another object of my invention is to provide an inexpensive current-collecting terminal for a rectifier of the plate type.

A further object of my invention is to provide a current-collecting terminal for a rectifier of the plate type which shall maintain its position regardless of vibrations and shocks to which the plate may be subjected.

A still further object of my invention is to provide an easily attachable current-collecting terminal for a rectifier of the plate type.

More concisely stated, it is an object of my invention to provide a simple and reliable current-collecting terminal for a rectifier of the plate type.

In accordance with my invention, a resilient shell having the form of a slotted washer is used for establishing contact with the surfaces of a rectifier plate. The shell is held in intimate engagement with the conductor deposited on the surface of the plate by a rivet or a bolt which passes through the plate and engages the shell. The holding element is insulated from the plate. The shells are relatively thin and provide the light positive pressure which is necessary for good contact in the case of rectifier plates.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a view in transverse section of a rectifier plate in accordance with my invention;

Fig. 2 is a view in top plan of a contact terminal used in the practice of my invention;

Fig. 3 is a view in end elevation of the terminal shown in Fig. 2;

Fig. 4 is a view in transverse section of a modification of my invention; and

Figure 5:
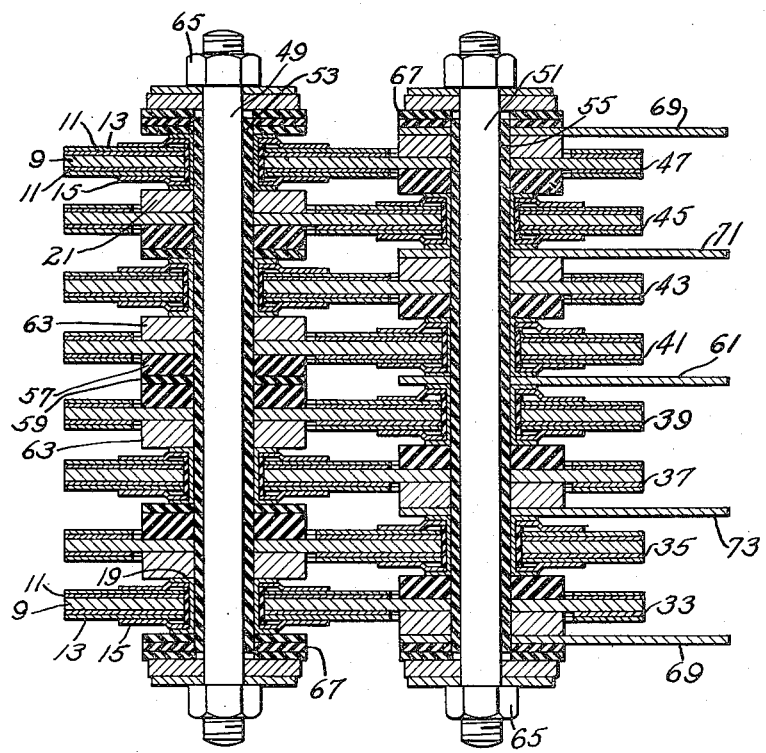
Fig. 5 is a view in transverse section of a rectifier assembly in which my invention is applied.

While my invention is applicable to control rectifiers of all types, it is illustrated herein as embodied in a plate rectifier of the copper-cuprous-oxide type.

The structure shown in Fig. 1 comprises a composite rectangular shaped plate 7 consisting of a copper base 9 on the surfaces of which cuprous oxide layers 11 are deposited. On each of the layers 11 a thin coating 13 of a conductive material, such as silver or a low melting lead-tin alloy is deposited. The manner in which the plate 7 is formed does not concern the present invention and need not be considered here. Because of the presence of the coating 13 the presence of a contact making element may be relatively small.

A pair of resilient shells 15 in the form of washers having equally spaced radial slots 17 are disposed in engagement with the upper and lower conductive coatings 13 on one side of the transverse axis of the plate 7. The shells 15 may be composed of any suitable metal, such as phosphor bronze alloy, for example. They are held firmly in contact with the conductive surfaces 13 by a rivet 19 which passes through an opening in the plate 7 and is peened over so that on both sides it firmly engages the unslotted central portions 21 of the shells. The rivet is insulated from the plate by a hollow cylinder 23 preferably composed of a phenolic condensation product. The cylinder 23 is slipped over the rivet 19 before the latter is inserted in the opening in the plate 7 and is held in place by the flanges produced when the rivet is peened over.

The shell assembly is used for establishing contact between an external conductor (not shown) and the cuprous oxide layers 11. For this purpose, the conductor may, for example, be welded or soldered to the rivet 19.

On the other side of the transverse axis, the plate 7 is provided with another opening. The latter opening is counterbored on both sides so that the cuprous oxide is entirely removed, leaving bare copper surfaces. A pair of washers 25 engage the copper surfaces on both sides and are held in intimate contact with the surface by a bolt 27. An external conductor (not shown) may be secured to the bolt thus establishing a connection to the copper bore 9 of the plate 7.

Where the dimensions of the plates are relatively extensive, I have found that a single set of resilient shells 15 is insufficient to attain the necessary surface of contact. Under such circumstances, the modification shown in Fig. 4 is used.

In this case, a pair of conducting sheets 29 are disposed on the conducting coatings 13 of the plate 31. A plurality of sets of resilient shells 15 are held in intimate engagement with the sheets 29 by rivets 19 which pass through the plate 31 and the sheets and are peened over in the same manner as in the Fig. 1 modification. The sheets 29 are interconnected and an external conductor (not shown) may be welded or soldered to either of them or to the rivets 19. In the Fig. 4 modification, only two sets of shells 15 spaced along the length of the plate 31 are used. If necessary, any number of sets may be added and the shells may be disposed along the width as well as the length to form a two dimensional array.

In the modification shown in Fig. 5, a rectifier assembly formed into a so-called Graetz network is shown. In this case, a plurality of plates 33, 35, 37, 39, 41, 43, 45 and 47 are prepared in the same manner as for the Fig. 1 modification, each being provided with a flush opening on one side and a counterbored opening exposing bare copper on the other. The plates 33 to 47 are stacked on a pair of bolts 49 and 51 which pass through the openings and are insulated from the plates by hollow cylinders 53 and 55 of a phenolic condensation product. For the two plates 39 and 41 at the center of the stack the counterbored and the flush openings are on the same side. At the counterbored openings, the plates 39 and 41 are separated by insulating spacers 57 which abut the bare surfaces of the base 9, which are face to face with each other, and an insulating washer 59 between the spacers. At the flush openings, the plates are separated by shells 15 which abut the face to face conducting coatings 13 and a sheet 61 between the shells.

Above and below the center plates 39 and 41, the other plates are stacked with their flush and counterbored openings alternately on one side and the other. For the plate 43 just above the plate 41, the flush opening is directly above the counterbored opening for the latter and for the plate 37 just below the plate 39 the flush opening is directly below the counterbored opening of the latter. The plate 45 just above the plate 43 is in the same position as the center plates 39 and 41 and the same is true for the plate 35 below the plate 37. The remaining plates 33 and 47 are correspondingly positioned.

On the side of their counterbored openings, the center plates 39 and 41 are separated from the corresponding adjacent plates 37 and 43, respectively, by conducting spacers 63 which abut the bare copper surfaces of the plates 39 and 41 and shells 15 which abut the coating 13 of the plates 37 and 43. Contact is thus established between the copper base 9 of the center plates 39 and 41 and cuprous oxide layers 13 of the adjacent plates 37 and 43, respectively. On the other side, the same plates 39 and 41 and 37 and 43, respectively, are separated by insulating spacers 57 which abut the bare copper of the latter plates and shells 15 which abut the coatings 13 of the former. The shells 15 on both sides of each of the plates 33 to 47 are interconnected by insulated rivets 19 as in the Fig. 1 arrangement. The remaining plates in the stack are separated in the same manner as those just discussed. Each plate has an insulating spacer 57 on one side of the counterbored opening and a conducting spacer 63 on the opposite side while shells 14 are provided at the flush openings. The conducting spacers 63 are disposed on the side of the counterbored openings away from the center and establish contact through the abutting shells 15 between the copper base 9 of one rectifier and the cuprous oxide 11 of the one adjacent to it. The plates in the stack are thus connected in a network.

The bolts 49 and 51 are threaded at the ends and the plates 33 to 47 together with their associated spacers and shells are held tightly by nuts 65 screwed on the threaded ends. The nuts are insulated from the shells 15 and the spacers 63 at the ends of the assembly by washers 67.

On one side of the assembly, conducting sheets 69 are interposed between the conducting spacers 63 at the end and the washers 67. The sheets 69 are interconnected and constitute the positive output terminal of the network. Conducting sheets 71 and 73 are also interposed between the spacers 63 of the plates 37 and 43 and shells 15 of the plates 35 and 45, respectively, that are located midway between the center plates 39 and 41 and the end plates 33 and 55 respectively. The alternating potential to be rectified is connected to the sheets 71 and 73.

When the assembly is connected to an alternating current source, the current flows through the upper alternating current sheet 71, the shell 15 in engagement therewith, the cuprous oxide 11 of the associated plate 45, the copper 9 of the same plate, the conducting spacer 63 associated with the plate 45, the shell 15 in engagement with the spacer, the cuprous oxide 11 and the copper 9 of the plate 47, the spacer 63 of plate 47 to the positive sheet 69; thence through the load (not shown) and the negative conducting sheet 61, the shell 15 of the lower central plate 39, the cuprous side and the copper of the plate 39, the spacer 13 of the plate 39, the shell of the next plate 37, the cuprous oxide and the copper of the plate 39, the spacer 63 of the plate 39 to the lower alternating current sheet 73. Corresponding circuits may be traced through the other plates.

By stacking the plates in other ways than that illustrated in Fig. 5, other rectifying networks than the Graetz circuit may be attained. It is to be noted that each portion of the Fig. 5 stack in both directions from the center constitutes a network of series connected plates. Separate stacks corresponding to these portions may be used where rectifier plates in series are necessary. For a parallel rectifier, the plates are stacked with all the counterbored and flush openings respectively coaxial and conducting spacers are used throughout. Series-parallel combinations may be produced by stacking a group of plates with their counter-bored and flush openings coaxial in the proper sequence.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, a rectifier plate of the type comprising a metal having a compound thereof deposited on its surface, a resilient conducting disc, means passing through said plate for holding said disc in intimate engagement with the surface of said plate on which said compound is deposited, an opening in said plate which is counterbored so that it is bounded by a strip of bare metal and conducting means contacting said metal and secured by means passing through said opening.

2. A rectifier plate assembly in which rectification is produced by the cooperation of a metal and a compound of the metal deposited on its surface comprising one terminal which consists of a conducting resilient disc in electrical contact with the compound riveted to the plate and another terminal consisting of a contactor bolted to the rim of an opening in the plate which is counterbored to the bare metal surface.

3. A rectifier assembly comprising a plurality of rectifier plates of the type comprising a metal and a compound of said metal, each plate having a flush opening and an opening counterbored to the bare metal and said plates being stacked with the flush opening of one plate coaxial with the counterbored openings of the plates adjacent thereto, a plurality of conducting spacers in contact with the bare metal rims of the counterbored openings on the same side of said plates, a plurality of insulatng spacers engaging the boundaries of the counterbored openings on the other side of said plates, and a plurality of resilient discs in electrical contact with the compound surfaces bounding the flush openings, said discs abutting the spacers with which they are face-to-face.

4. A rectifier assembly comprising a plurality of rectifier plates of the type comprising a metal and a compound of said metal, each plate having a flush opening and an opening counterbored to the bare metal and said plates being stacked with the flush opening of one plate coaxial with the counterbored openings of the plates adjacent thereto, a plurality of conducting spacers in contact with the bare metal rims of the counterbored opening on the same side of said plates, a plurality of insulating spacers engaging the boundaries of the counterbored openings on the other side of said plates, a plurality of resilient discs in electrical contact with the compound surfaces bounding the flush openings, said discs abutting the spacers with which they are face-to-face, and means for interconnecting the discs associated with each plate.

5. A rectifier assembly comprising a plurality of rectifier plates of the type comprising a metal and a compound of said metal, each plate having a flush opening and an opening counterbored to the bare metal and said plates with the exception of the two center plates being stacked with the flush opening of one plate coaxial with the counterbored openings of the plates adjacent thereto, the two center plates being stacked with their flush and counterbored openings coaxial, a plurality of conducting spacers in contact with the bare metal rims of the counterbored openings on the same side of said plates for the plates on each side of the center of the stack but on opposite sides of corresponding plates on opposite sides of the center of the stack, a plurality of insulating spacers engaging the boundaries of the counterbored openings on the other side of said plates, and a plurality of resilient discs in electrical contact with the compound surfaces bounding the flush openings, said discs abutting the spacers with which they are face-to-face.

IRVING R. SMITH.